I. H. FREUND.
CEMENT SLAB OR TILE WITH LIGHT PANE.
APPLICATION FILED MAR. 4, 1912.

1,041,990.

Patented Oct. 22, 1912.

UNITED STATES PATENT OFFICE.

IGNATZ H. FREUND, OF CHICAGO, ILLINOIS, ASSIGNOR TO FEDERAL CEMENT TILE COMPANY, OF CHICAGO, ILLINOIS, A CORPORATION OF ILLINOIS.

CEMENT SLAB OR TILE WITH LIGHT-PANE.

1,041,990.  Specification of Letters Patent.  Patented Oct. 22, 1912.

Application filed March 4, 1912. Serial No. 681,557.

*To all whom it may concern:*

Be it known that I, IGNATZ H. FREUND, a resident of Chicago, in the county of Cook and State of Illinois, have invented a new and useful Improvement in Cement Slabs or Tiles With Light-Panes, of which the following is a specification.

This invention relates to illuminating slabs or tiles and more especially to cement slabs or tiles used for roofing purposes.

The object of the invention is to provide a cement slab or tile which is not liable to breakage due to differences in expansion or contraction of the glass and cement.

The invention comprises the construction and arrangement of parts hereinafter described and claimed.

Figure 1:
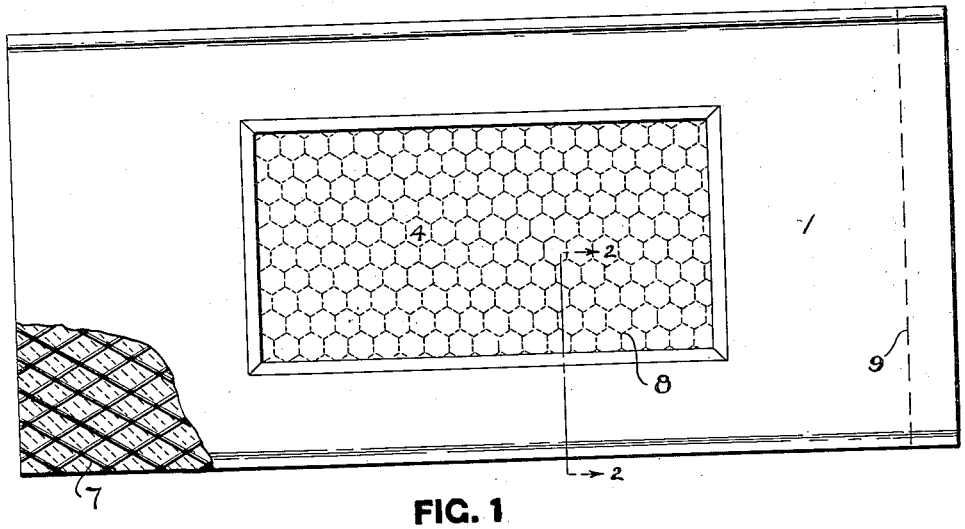
Figure 2:
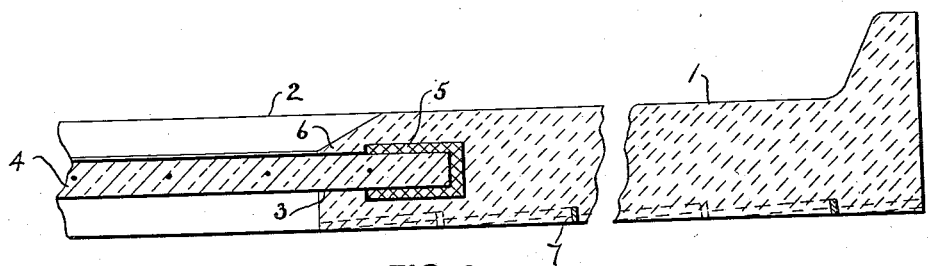
Figure 3:
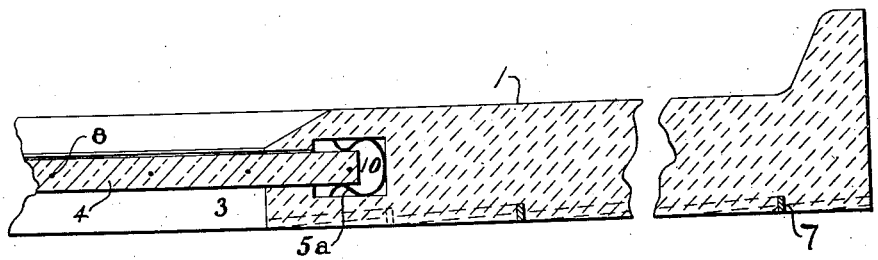

In the accompanying drawings, Figure 1 is a plan view partly broken away, of one embodiment of my invention; Fig. 2 is a section thereof on the line 2—2, Fig. 1; and Fig. 3 is a view corresponding to Fig. 2, showing a modification.

My invention comprises a tile or slab having a body 1, of comparatively large superficial area and comparatively thin, the body thereof being formed of cement or concrete and provided with a large opening 2 which is surrounded by a ledge 3 upon which is seated a sheet of glass 4. The edges of this sheet are embedded in the cement or concrete and held in place by adhesion being put in place during molding of the tile so that it practically becomes integral with the cement. To prevent breakage or cracking of the glass which may be caused by differences in ratio of expansion and contraction of the cement and glass, the edge of the glass plate is set in a suitable cushion interposed between the glass and cement, which absorbs any difference in movement of the two materials due to changes in temperature or other causes. This cushion may be formed as a homogeneous mass of some suitable plastic material or it may be formed of metal in such a manner as to act as a cushion.

In Fig. 2 the cushion is shown as a pocket or cap 5 surrounding the edge of the glass and in contact with both side portions thereof. The cushion 5 is formed of a plastic material, as for example, asphalt, and is placed in position around the edges of the glass before placing it in concrete. The cushion 5 of plastic material extends around all four edges of the glass. Preferably a portion of the cement, or concrete, as at 6, is worked over the pocket or cushion 5 of plastic material and beyond the same and over the outer face of the glass but not into full contact therewith, so as to more securely hold the same in position. This cement portion is sloped or beveled as shown, so as to provide a perfectly flat outer or upper surface and thus prevent the lodgment of rain or snow. The bond between the glass, the cushion 5 and the cement is so formed that no water can penetrate to the joint. The cushion 5 is comparatively compressible or yielding and absorbs or permits slight relative movement, especially edgewise, between the glass and tile caused by variations in temperature and the difference in expansion and contraction of the two materials.

The body 1 may be composed only of cement, mortar or concrete but to give additional strength and prevent pieces from falling if the tile should crack, it is preferred to embed in the cement body metal or similar reinforcements, such as the expanded metal shown at 7. For similar reasons the sheet of glass 4 may be reinforced by having embedded therein a metal trellis 8, such glass being what is ordinarily known as wire glass.

The invention may be applied for securing a sheet of glass in a slab, while the same is made in place on a roof, wall, floor or other place or, if preferred, to a tile or slab intended to be finished and thereafter transported to the place where it is to be used. For this reason, although the invention is shown as applied to a tile, it is not to be understood as limited to a tile but to cover all forms of concrete slabs embodying a glass sheet and within the scope of the appended claims.

The tile is shown formed with interlocking portions for attachment of one tile to the adjacent ones and also suitable means for hooking over or otherwise attaching to the roof purlins or frame members.

The tile shown in the drawing is provided at one end on its lower face with the hook member, indicated by the dotted line 9, for hooking over the roof purlins, and at its edges is provided with ridges for receiving the interlocking member. Inasmuch, however, as these features may be varied within wide limits, and are not claimed, they are not shown in detail. The tile may, if desired, be made without these interlocking features and is so made when it is constructed in the place where it is to be used.

The tile described is intended more especially for bridging large openings, such as forming roofs of buildings such as shops and factories, through which it is desired to obtain light. The tile body is of comparatively large superficial area and comparatively thin and the glass sheet likewise is comparatively large and thin. One size made has the body of the tile 52" long, 24" wide and 7/8" thick, and the glass sheet 22" long, 10" wide and about 5/16" thick. The tile, therefore, is strictly speaking, a slab and not a block and the glass is, strictly speaking, a sheet. The cushion 5 shown is preferably about 1/2" wide extending all the way around the said edges of the glass and imprisoning the same.

In the form shown in Fig. 3 the pocket or cushion 5ᵃ is shown as formed of comparatively thin bent sheet metal embracing the edge of the glass and providing a clear space 10 between the glass and cement. This cushion shields the edge of the glass from contact with the concrete and absorbs or permits relative movement between the glass and cement in the same manner as the plastic cushion 5 and is likewise inserted into place during molding of the tile; otherwise this form of the invention is the same as that illustrated in Fig. 2.

The tile described and shown in the drawings is an improvement upon that illustrated, described and claimed in my prior Patent No. 860,796 granted July 23, 1907. It was found in practice that although, in tiles constructed according to that patent, the co-efficients of expansion of the cement and glass are practically identical, there was a very slight difference between them, which under conditions of use became intensified or magnified by great variations in temperature, as for example, the difference between the minimum temperature of winter and the maximum of summer. Such great variations as this causes the glass to crack. With a tile or slab constructed according to my present invention, slight relative yield or movement between the glass and cement is permitted and the danger of breakage or crackage is decreased. The tile or slab described is a combination of cement and glass and in the case of the tile, is or may be an exact counterpart of the standard roofing tiles and formed to interlock with the same as does any other roofing tile. This tile is capable of being provided with hooks to take over the roof purlins and to interlock with the standard roof plates, being laid loosely so that it will take up expansion and contraction as well as vibration. The tile itself, and also the glass, while comparatively thin, are reinforced in a manner to expose no metallic portions on the surface and no metal frame is required to carry either the tile or the glass. The latter is carried entirely by the cement body. The surface of the tile is comparatively even and has no projecting portions to stop the rain or snow so that it is practically self-cleaning and enables the glass to give maximum light. It is unnecessary to flash the tiles themselves or the glass in the tile in order to make a water tight joint. When wire glass is used the tile is practically fire proof, as the glass is embedded in the cement and becomes an integral part of the latter.

What I claim is:

1. A construction of the character described comprising a thin slab of cement provided with a large opening, a sheet of glass covering said opening, and means within the integral cement body and adapted to permit relative movement between the sheet of glass and the slab of cement, the cement body being molded around said means and the edges of the glass sheet and brought into close juxtaposition with both sides of the glass sheet, the edges of said glass sheet and said means being both thereby permanently embedded in the slab of cement.

2. A construction of the character described comprising a thin concrete slab provided with a large opening and having a rabbet surrounding the same, a sheet of glass seated in said rabbet and molded in the concrete slab, and a cushion located between the edge portions of the sheet of glass and the concrete and wholly buried in the concrete slab, being thereby protected by the concrete and permitting movement of the glass sheet with reference thereto.

3. A construction of the character described comprising a thin cement slab provided with a large opening having a rabbet surrounding the same, a sheet of glass resting in said rabbet and having its edge portions embraced by the cement body, and a cushion of plastic material between the sheet of glass and the cement slab and held permanently in place by the setting of the cement around the edges of the glass.

4. A construction of the character described comprising a thin cement slab provided with a large opening, a sheet of glass covering said opening and having its edges embedded in the cement, and a cushion of asphaltic material between the sheet of glass and the cement slab, said cushion being elastic and adapted to absorb relative movement between the sheet of glass and cement and being permanently inclosed by the body of the cement slab.

In testimony whereof, I have hereunto set my hand.

IGNATZ H. FREUND.

Witnesses:
 THEODORE RUBOVITS,
 L. DOBBERMAN.